Patented Jan. 27, 1931

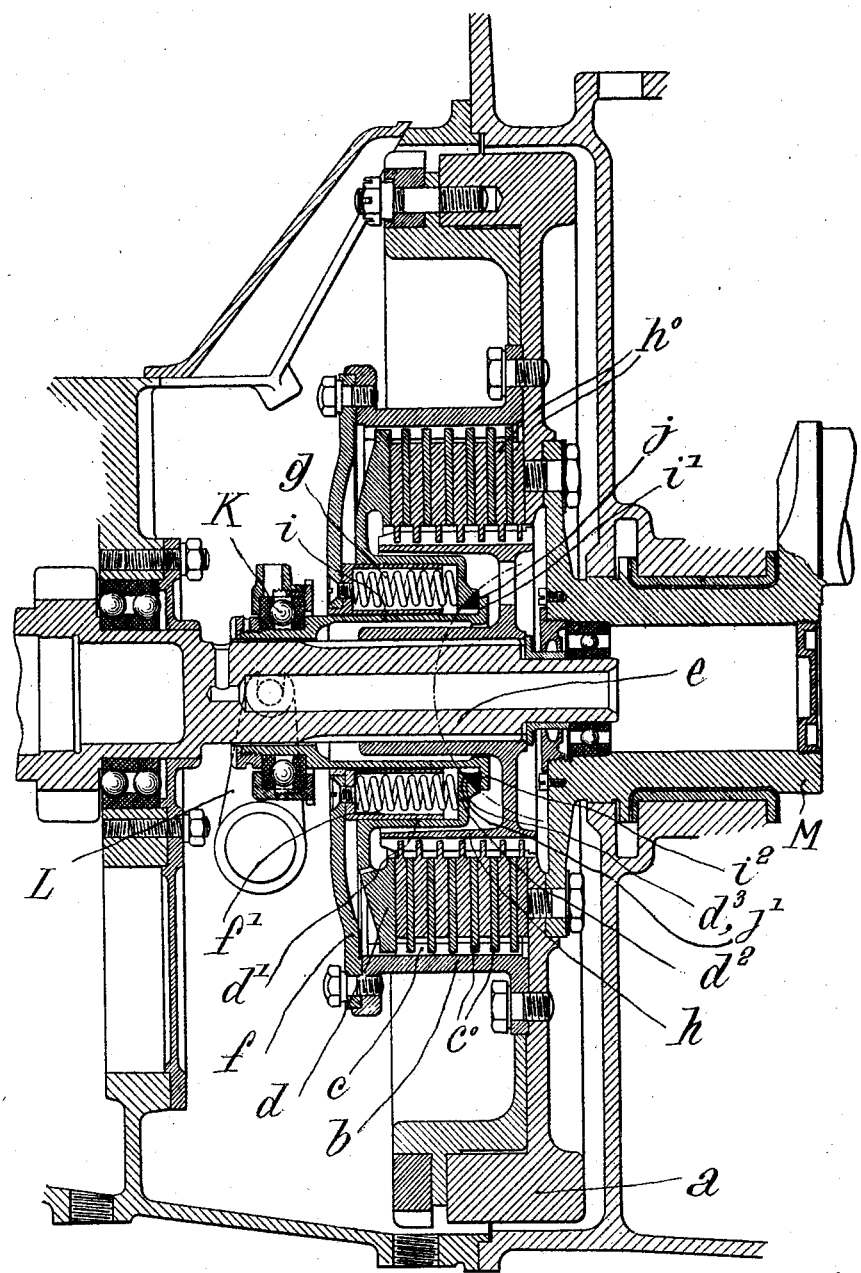

1,790,400

UNITED STATES PATENT OFFICE

MARC BIRKIGT, OF BOIS-COLOMBES, FRANCE

CLUTCH

Application filed June 10, 1929, Serial No. 369,747, and in Switzerland March 27, 1929.

The present invention relates to clutches and, more particularly, to the type of clutch structures now commonly in use on automobiles.

In clutch assemblies as ordinarily constructed a certain amount of chattering and vibration is found to exist at the moment that the clutch is thrown in. This vibration is known to be caused by minute flexions of the motor driving or of the driven shaft. As the motor advances in age, the driving and driven shafts turn less and less true and the vibration due to flexion is supplemented by that due to irregularities in the turning movement.

One of the objects of the invention is to provide means operable to correct irregularities in the rotation of either of the interengaging elements forming the clutch.

Another object is to provide means operable to uniformly distribute the clutch pressure.

Further objects will appear in the course of the detailed description now to be given with reference to the accompanying drawing in which the single figure represents an axial section through one illustrative embodiment of the invention.

M is the motor crank-shaft driving a fly-wheel $a$,—$b$, a cylindrical casing rigidly bolted to wheel $a$, said casing being provided with internal longitudinal grooves $c$ serving as guides for teeth formed on driving discs $c^0$,—$d$, an end-pressure member also having teeth slidably engaging in grooves $c$, said member being integral with a guide $d^1$ terminating in an abutting portion $d^2$ provided with a spherical surface $d^3$,—$e$, the driven shaft,—$f$, a disc rigidly bolted to casing $b$ and carrying an annular slide $f^1$ fitted with a plurality of springs $g$,—$h$, a guiding element mounted in grooves formed on driven shaft $e$ and having external longitudinal grooves formed therein coacting with teeth formed on the internal periphery of driven discs $h^0$,—$i$, a sleeve fitting loosely over shaft $e$ and terminating in an abutting portion $i^1$,—$j$, an annular ring having a spherical surface $j^1$ coacting with surface $d^3$ and slidably mounted on radial surface $i^2$,—$k$, a ball bearing,—and L, a lever controlling the clutch assembly.

From the foregoing description, it will be seen that when lever L is moved from left to right, abutment $i^1$ will move inward and cause pressure member $d$ to bring discs $c^0$ and $h^0$ into frictional engagement. If, for any reason, fly-wheel $a$ or any of the elements engaging therewith do not turn true, spherical contacting surfaces $d^3$, $j^1$ will permit sleeve $i$ (which is free of shaft $e$) to follow the irregularities in the movement of the fly-wheel and the chattering or vibration normally unavoidable in clutch assemblies will be done away with. Joint $d^3$, $j^1$ may, in other words, be considered to constitute a universal joint rendering the movements of the elements mounted on fly-wheel $a$ independent of those coacting with sleeve $i$. It will be noted that ring $j$ is not integral with element $i^1$ but is slidable on radial surface $I^2$. This form of construction is designed to correct any defect in the intersection of the axes of shaft $e$ and of the main crank-shaft due to wear or other cause. Spherical surfaces $d^3$, $j^1$ act as a simple universal joint as long as the axes of said shafts lie in alignment, ring $j$ remaining immovable on surface $i^2$. As soon as the aforementioned axes cease to lie in alignment, the sliding movement of ring $j$ on surface $i^2$ corrects this defect, surfaces $d^3$, $j^1$ continuing to function as before. Obviously, in order that ring $j$ may follow the movement of either one of the shafts, it must be mounted in floating relation to both.

It will be noted that, in the drawing, the external surface of element $i$ is shown in sliding contact with the internal surface of element $f^1$. While, at first hand, it might appear that this contact would prevent free movement of element $i$ relatively to the fly-wheel assembly, in actual practice it is found that this is not the case, element $i$ being only displaced by amounts so small that, if the contact is a loose sliding fit (and provided $i$ is designed so as to bend slightly), its proper functioning is not interfered with.

While the invention has been illustrated as applied to a clutch of the multiple disc type, it is apparent that it may be used equally well in clutches operating on other principles.

What I claim is:—

1. In combination, a driving shaft, a driven shaft, and clutch means interposed between said driving and driven shafts, said clutch means including a first element rotatable coaxially with one of said shafts, a second element having a spherical surface formed thereon, said second element being slidably mounted on said first element in directions radial to the axis of one of said shafts and a third element having a spherical surface, adapted to coact with the spherical surface of the second element, said third element being displaceable in directions forming an angle with the axis of rotation of the first element.

2. In combination, a driving shaft, a driven shaft, and clutch means interposed between said shafts and adapted to connect the latter in driving and driven relation, said clutch means including an assembly mounted on the driving shaft, clutch actuating means, a displaceable element connected to said clutch actuating means and movable in directions substantially parallel to the axis of the driven shaft, an element articulating universally with one of the elements forming said assembly and positioned to contact with the displaceable element to slide radially with respect thereto.

In testimony whereof I have signed this specification.

MARC BIRKIGT.